…

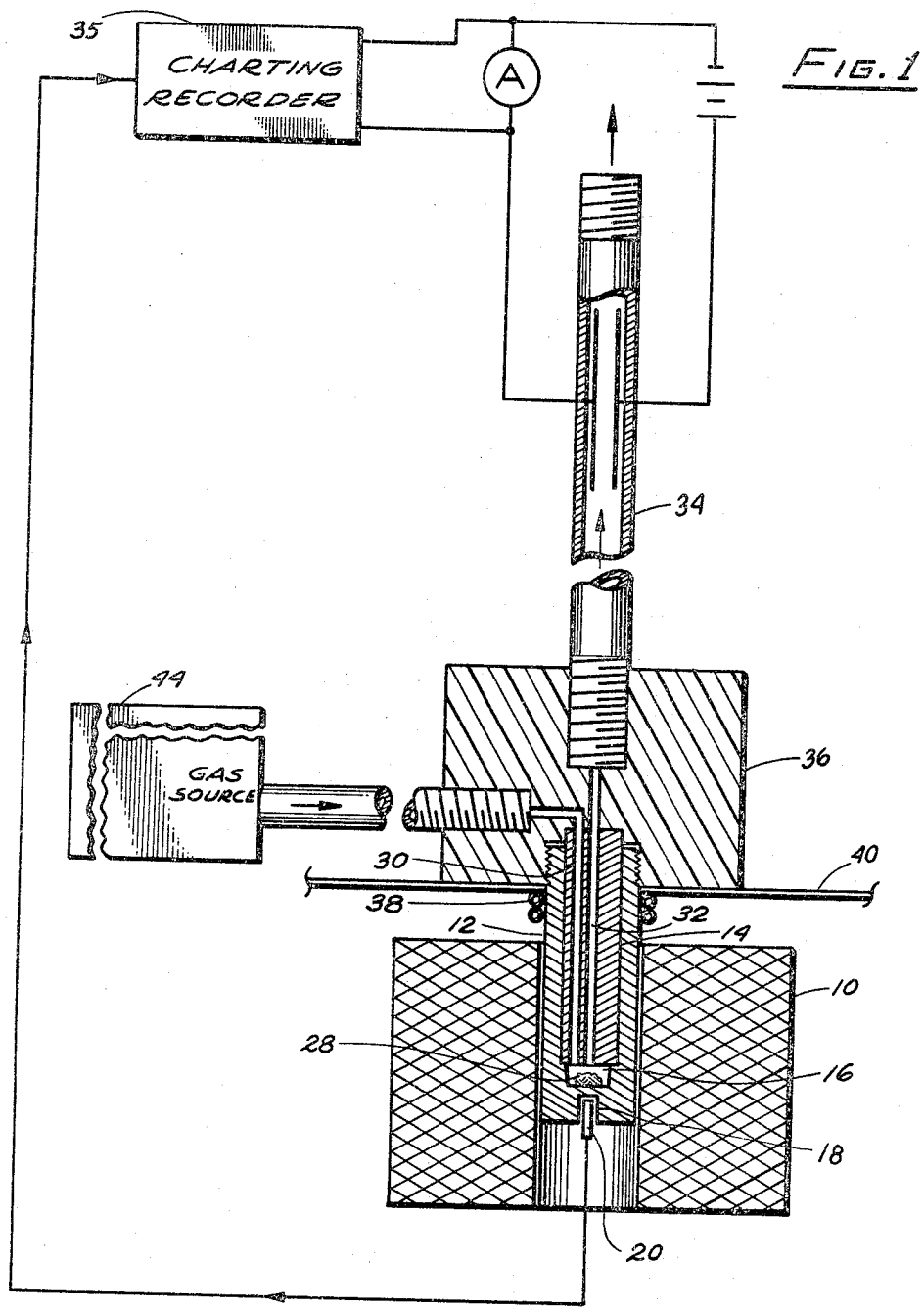

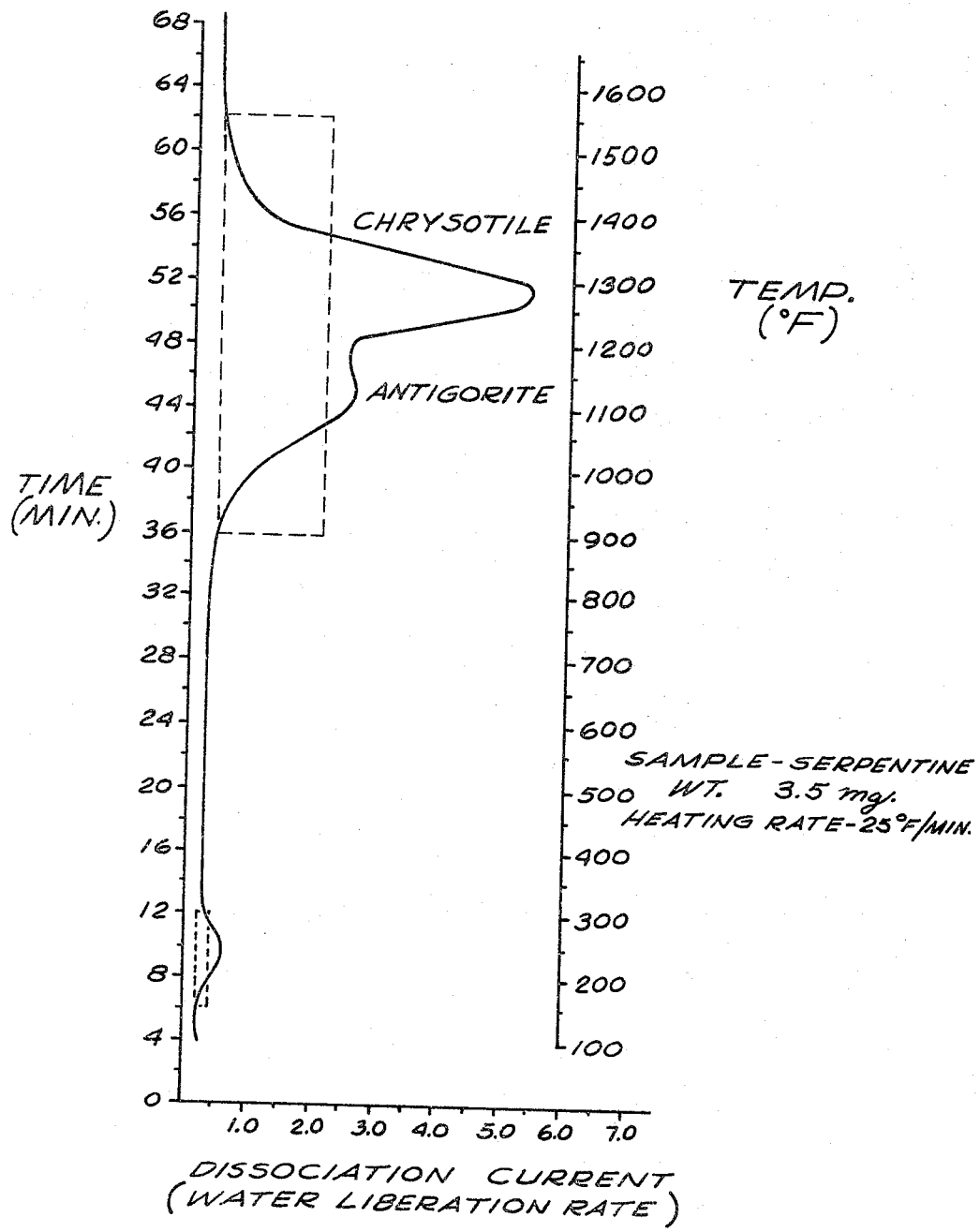

United States Patent Office 3,327,524
Patented June 27, 1967

3,327,524
APPARATUS AND MEANS FOR OBTAINING WATER FROM ROCKS
Jack H. Osgood, Westminster, Calif., assignor to North American Aviation, Inc.
Filed Apr. 7, 1965, Ser. No. 446,314
3 Claims. (Cl. 73—76)

This invention relates to a hygroanalyzer; and more particularly to a device for analyzing the water-content of solids.

Introduction

It is recognized that astronauts exploring the moon must have a supply of water; and it was first believed that this water must be brought from earth. It is now believed that, rather than transporting a limited amount of water from the earth, it is possible to obtain water from the lunar rocks that form the moon's surface; and that these rocks will provide a continuous supply of water.

In order to design equipment for obtaining water from lunar rocks, it is first necessary to analyze the type of rocks that would be available, and to determine how much water may be obtained from these rocks.

It has been found that certain rocks here on earth, primarily igneous rocks, which are believed to abound on the moon, contain water that has been bound within the rocks from the time that the rocks were formed. It has also been found that this bound-water may be freed by heating the rocks to very high temperatures, for example 1,000° C. Since the lunar rocks have not been heated to these temperatures, the lunar rocks still contain their bound-water.

It has additionally been found that each type of rock has particular types of bound-water; and frees these bound-waters at specific temperatures. Thus, a hygroanalyzer that measures the amount of bound-water and the temperature at which it is freed, gives an indication of the amount of water available from lunar rocks; and, as a by-product, is a laboratory tool for indicating the types of rock in a rock composite.

Objects and drawings

It is therefore the principal object of this invention to provide a hygroanalyzer.

It is another object of the invention to provide a hygroanalyzer that indicates the amount of water liberated at a number of given temperatures.

It is a further object of this invention to provide a hygroanalyzer that will yield quantitative dehydration-versus-specific-temperature data for any solid.

It is still another object of this invention to provide a hygroanalyzer that may be used to analyze the component rocks of a rock composite.

Attainment of these objects and others will be realized from the teachings of the following specification, taking in conjunction with the drawings, of which—

FIGURE 1 is a cross-sectional view of apparatus for practicing the invention; and FIGURE 2 is a water-liberation-versus-temperature graph for a rock-composite.

Synopsis

Broadly stated, the present invention comprises a furnace for heating a rock sample to temperatures at which the bound-moisture is liberated, a carrier-gas flow arrangement that picks up the liberated moisture, a cell that measures the amount of liberated moisture, and a device that indicates the amount of moisture liberated at various temperatures.

Description of invention

The hygroanalyzer shown in FIGURE 1 comprises a heater 10, which may comprise a plurality of electrical resistance wires; heater 10 surrounding a retort 12 formed of material such as stainless steel or Inconel. Retort 12 has a cylindrical axial bore, into which is fitted a plug 14, also formed of stainless steel or Inconel; plug 14 fitting into retort 12 in such a way as to leave a small combustion chamber 16 at the bottom of the retort. The lower end of the retort 12 may have a hole drilled into it; this hole forming a well 18, in which is positioned a thermocouple 20.

As shown in FIGURE 1, plug 14 has two longitudinal capillary passageways therethrough, the first inlet longitudinal passageway 30 being used to introduce a dry carrier-gas, such as nitrogen, into the combustion chamber; and the second exhaust longitudinal capillary passageway 32 being used to remove the carrier-gas and the entrained liberated moisture from the combustion chamber 16.

The moisture-carrying gas in exhaust passageway 32 is applied to cell 34, such as the Beckman Instruments, Inc., Platinum Electrolytic Cell, Catalogue Number 25047, that measures the amount of entrained moisture in the gas-stream. Briefly stated, cell 34 (shown schematically) comprises two platinum electrodes that have a voltage applied between them, the electrodes being in an atmosphere of phosphoric pentoxide ($P_2O_5$). In use, the moist gas passes through the phosphoric pentoxide, which absorbs the moisture to form phosphoric acid; this acid being a conductor of electricity. During the electrical conduction, the acid breaks down (dissociates) to produce phosphoric pentoxide, which is again available to continue the process. An ammeter measures the flow of electrical current, which is a direct indication of the amount of moisture in the gas. This cell is very sensitive, and will measure one part in a million. Alternatively, the output of the cell 34 may be applied to a charting recorder 35.

The upper end of retort 12 and the lower end of cell 34 fit—as by means of a leak-proof threaded connection—into a coupling 36 of an anhygroscopic material such as Teflon. The coupling 36 provides a first flow-path for dry carrier-gas to pass through the inlet capillary passageway 30, and thus reach the combustion chamber; and also provides a second flow-path for the moisture-carrying carrier-gas to pass from the combustion chamber through the exhaust capillary passageway 32, and thus to cell 34.

In operation, a sample 28 of suitably pulverized rock is placed in the combustion chamber 16, and the heater 10 is energized to slowly raise the temperature in the combustion chamber; thermocouple 20 sensing the temperature and sending a temperature signal to temperature indicator or recorder 35. If desired, the thermocouple may be connected in a feed-back loop (not shown) to assure that the heater raises the temperature at the desired rate. Dry nitrogen carrier-gas from a gas source 44 flows through inlet passageway 30 into the combustion chamber, where it picks up the moisture liberated from the heated rock sample. The moisture-containing carrier-gas now flows through the exhaust passageway 32, and through the previously described cell 34.

If desired, a cooling coil 38 and a heat reflector 40 may be positioned between the furnace and the cell, in order to protect the cell 34 from being overheated.

The exhaust passageway 32 between the combustion chamber and the cell is the only place where the liberated water can deposit; and, in order to minimize this possibility, the passageway is made extremely short (typically 1 inch) and of a capillary diameter (typically .020 inch), and the retort 12 and the plug 14 are maintained at substantially the same temperature as the combustion chamber. As a result, there is an extremely close correlation between the instantaneous temperature of the rock sample as read by the thermocouple, and the moisture content of the gas as indicated by the ammeter.

This output signal from the cell may be applied to a recording or charting device, such as Varian Strip Chart Recorder, Model G-14, that draws a time and temperature-versus-moisture curve, as shown in FIGURE 2. This arrangement is so sensitive that—as shown in FIGURE 2—the chart shows individual peaks associated with the liberation of moisture from two different types of rock, chrysotile and antigorite, in a single rock sample of serpentine; as well as showning the liberation of surface-moisture at a much lower temperature.

The described device thus indicates the amount of moisture liberated at each temperature; the peaks of moisture-liberation indicating both the type of rocks that are present in the rock sample and the amount of water that is liberated. In order to obtain the total amount of moisture, irrespective of the temperature at which it was liberated, a planimeter traces the line forming the curve, and provides the area under the curve—which is a measure of the total amount of moisture liberated during the heating process, this being indicated by the dotted rectangles.

Tests show that some rocks contain relatively large amounts of water that are liberated at relatively low temperatures, serpentine being a sample of this type of rock. When hygroanalyzing samples of this type of rock, it is therefore necessary to either heat the sample at a relatively slow rate, and/or to use a small sample of pulverized rock, in order to obtain satisfactory results. It should also be noted that slower heating rates tend to provide a more distinct separation between the peaks produced by moisture liberated by various temperatures.

It will be realized that when a device of this type is operated on the moon, it will require a more or less continual supply of heat. This heat may be obtained in a number of ways. For example, a small nuclear reactor or solar energy may be used. In the case of the nuclear reactor, it is necessary to use a model that will not only supply the necessary quantity of heat, but will also be capable of raising the rock-sample to the desired temperatures. If a solar source of heat is to be used, it would be desirable to provide a heat-storage device in order to make the operation continuous even while it is in the shadow-portion of the moon.

Solar devices themselves may take several forms, among which are lenses and mirrors. The lenses may be the usual type, or may take the form of a Fresnel lens which is formed either of plastic or of glass. The mirrors on the other hand may take the form of a parabolic or a spherical reflector. The parabolic reflector, which is a little more efficient, requires a support to maintain its shape; whereas the spherical reflector may be the inner surface of an inflated sphere.

Although the invention has been described and illustrated in detail, it is to be clearly understood that the same is by way of illustration and example only and is not to be taken by way of limitation; the spirit and scope of this invention being limited only by the terms of the appended claims.

What is claimed is:
1. A hygronalyzer for measuring the amount of bound-water liberated from a sample at various temperatures, comprising:
   a furnace having a combustion chamber for a sample,
   a heater for raising the temperature of a sample in said combustion chamber to a plurality of progressively higher temperatures, means comprising a first passageway for introducing a dry carrier gas into said combustion chamber, and means comprising a second passageway for exhausting the gas-and-liberated-moisture from said combustion chamber;
   hygrometer cell means, comprising a hygrometer cell located in the second carrier-gas exhausting passageway, for measuring the amount of liberated-moisture in said carrier gas; and
   recorder means for charting the amount of liberated moisture versus the temperatures at which the moisture is liberated.
2. A hygroanalyzer comprising:
   (1) a furnace having
      (a) a retort having an axial bore
      (b) a plug positioned in said bore to produce a combustion chamber, said plug having a first longitudinal inlet capillary passageway for introducing a dry carrier-gas into said combustion chamber, and having a second longitudinal exhaust capillary passageway for exhausting moisture-carrying carrier-gas from said combustion chamber
      (c) heater means for raising the temperature of said combustion chamber, said retort, and said plug
   (2) thermocouple means for measuring the temperature of said combustion chamber;
   (3) hygrometer cell means for measuring the amount of moisture in said moisture-carrying carrier-gas;
   (4) a coupling having first means for providing a leak-proof connection to said plug, and having second means for providing a leak-proof connection to said cell, said coupling providing a flow-path for conducting a dry carrier-gas to said inlet capillary passageway, and providing a flow-path for conducting said moisture-carrying carrier-gas from said second exhaust passageway to said cell; and
   (5) means, connected with said cell and said thermocouple, for charting the amount of liberated-moisture versus the temperature at which the moisture was liberated.
3. A hygroanalyzer comprising:
   (1) a furnace having
      (a) a retort having an axial bore
      (b) a plug positioned in said bore to produce a combustion chamber, said plug having a first longitudinal inlet capillary passageway for introducing a dry carrier-gas into said combustion chamber, and having a second longitudinal exhaust capillary passageway for exhausting moisture-carrying carrier-gas from said combustion chamber
      (c) heater means for raising the temperature of said combustion chamber, said retort, and said plug
   (2) thermocouple means for measuring the temperature of said combustion chamber;
   (3) hygrometer cell means for measuring the amount of moisture in said moisture-carrying carrier-gas;
   (4) a coupling having first means for providing a leak-proof connection to said plug, and having second means for providing a leak-proof connection to said cell, said coupling providing a flow-path for conducting a dry carrier-gas to said inlet capillary passageway, and providing a flow-path for conducting said moisture-carrying carrier-gas from said second exhaust passageway to said cell;

(5) means, connected with said cell and said thermocouple, for charting the amount of liberated-moisture versus the temperature at which the moisture was liberated; and (6) means, comprising cooling coils and a heat shield, for protecting said cell from being overheated by said furnace.

References Cited

UNITED STATES PATENTS

| | | | |
|---|---|---|---|
| 2,676,417 | 4/1954 | Ekelund | 73—76 |
| 2,976,728 | 3/1961 | Brogan et al. | 73—336.5 |
| 3,055,206 | 9/1962 | Watson et al. | 73—76 X |
| 3,144,765 | 8/1964 | Wollner | 73—76 |
| 3,183,710 | 5/1965 | Spang | 73—76 |

FOREIGN PATENTS 937,120    9/1963    Great Britain.

RICHARD C. QUEISSER, *Primary Examiner.*

J. H. WILLIAMSON, *Assistant Examiner.*